United States Patent

[11] 3,593,719

| [72] | Inventors | Robert Ashton<br>Islington, Ontario;<br>Jerzy M. Brzustowski, Toronto, Ontario,<br>both of, Canada |
|---|---|---|
| [21] | Appl. No. | 812,750 |
| [22] | Filed | Apr. 2, 1969 |
| [45] | Patented | July 20, 1971 |
| [73] | Assignee | Massey-Ferguson Industries Limited<br>Toronto, Ontario, Canada |

[54] COMBINE WITH THREE-STAGE SEPARATION
9 Claims, 3 Drawing Figs.

[52] U.S. Cl. .................................................. 130/21,
130/26, 130/27 W
[51] Int. Cl. ................................................ A01f 12/00
[50] Field of Search ........................................... 130/27.5,
27.6, 27.8 F, 27.32, 27.19, 21, 24, 25, 26, 27 R

[56] References Cited
UNITED STATES PATENTS

| 3,373,871 | 3/1968 | Huether | 130/27 R |
| 3,412,735 | 11/1968 | Bichel et al. | 130/27 R |
| 1,864,772 | 6/1932 | Sprague | 130/21 |
| 1,917,536 | 7/1933 | McIntire | 130/21 |
| 2,937,647 | 5/1960 | Allen et al. | 130/26 |
| 2,995,135 | 8/1961 | Krum | 130/27.19 |

*Primary Examiner*—Antonio F. Guida
*Attorney*—Tweedale & Gerhardt

ABSTRACT: A combine harvester thresher with three stages for the separation of grain from the crop material. The three stages include a cylinder and open grate concave, a raddle and fanning mill, and straw walkers. The grain separated in all three stages is conveyed to a shaker shoe for cleaning.

INVENTORS
ROBERT ASHTON
BY JERZY M. BRZUSTOWSKI

Tweedale & Gerhardt
ATTORNEYS

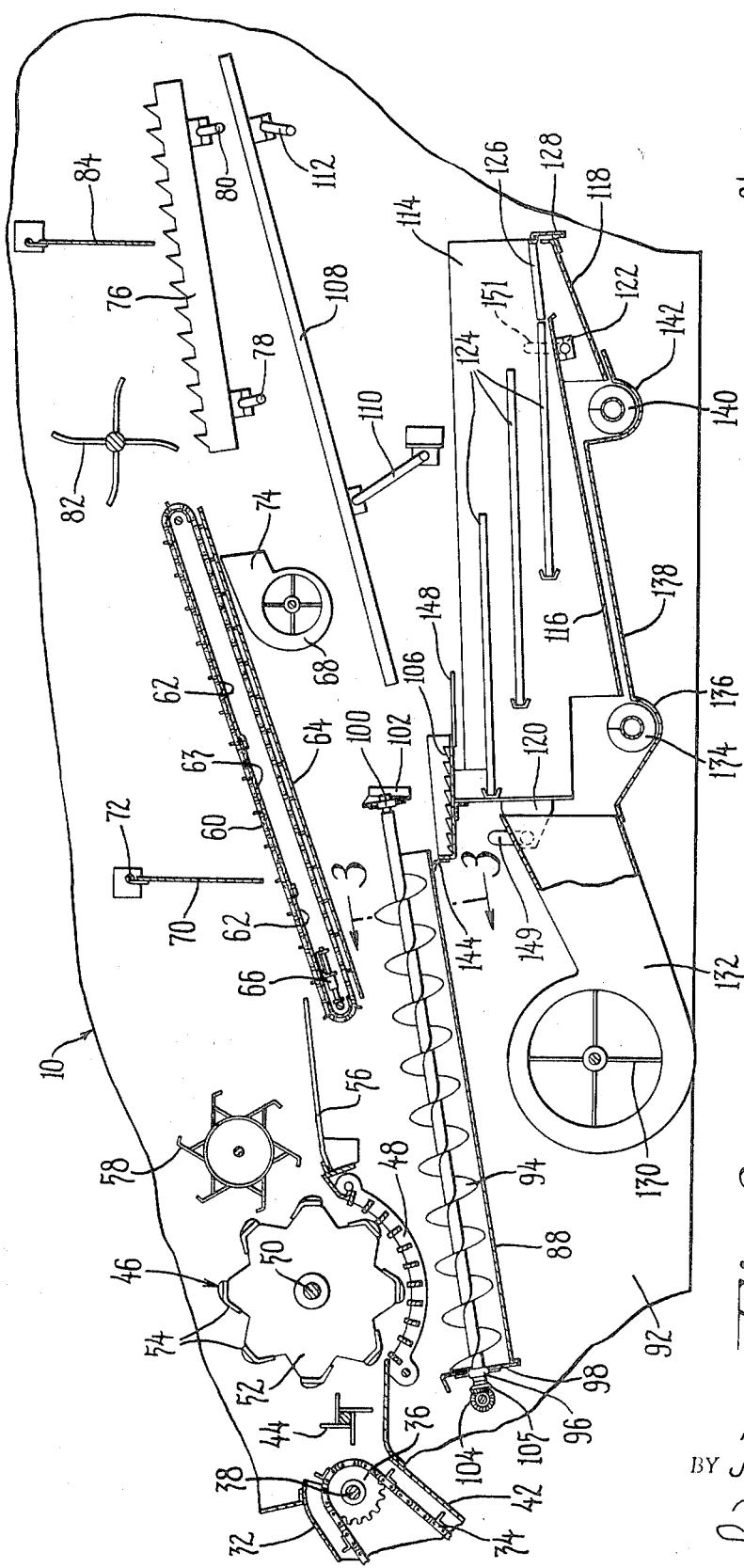
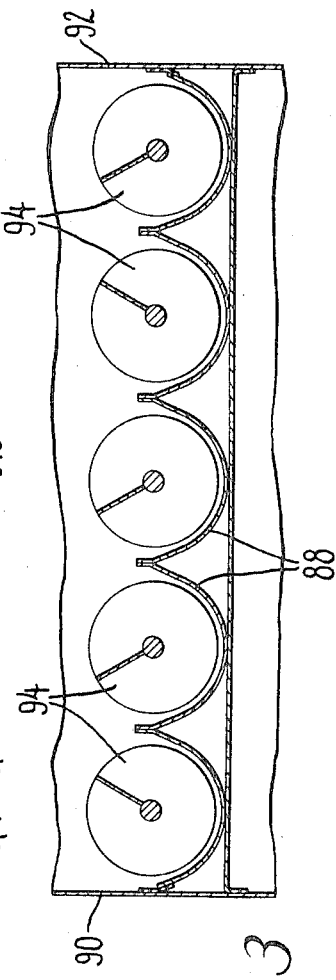

3,593,719

COMBINE WITH THREE-STAGE SEPARATION

This invention relates generally to agricultural combines for grain harvesting and threshing. More specifically, the invention relates to a self-propelled combine harvester thresher with three separate stages for separating grain from straw or stocks.

Agricultural combines which are in use at the present time have two stages for separating grain from straw. One of the commonly used separating systems has a first stage for separating grain which consists of an open grate concave and a cylinder. Straw walkers provide the second and final stage for the separation of grain from the straw. With this system the cylinder and the open grate concave separate up to 90 percent of the grain from the straw by allowing the grain to fall through the holes in the concave. The grain remaining in the straw after it passes through the cylinder and concave is separated by the straw walkers.

Another commonly used separating system has a cylinder and a closed grate concave which threshes the crop material but does not separate the grain. In this separating system, the first stage for separation of grain from the straw consists of a raddle and a fanning mill. The raddle conveys the threshed crop material to the rear. As the material moves from the rear of the raddle, it is subjected to a stream of air from the fanning mill. The grain falls through the stream of air and the straw is conveyed on to the second and final stage for separation. This second stage consists of straw walkers which bounce the material up and down to separate the remaining grain.

The principle object of this invention is to provide an agricultural combine with an improved separator having three separate stages for separating grain from straw.

The improved separator of this invention has a first stage for separation of grain which includes a cylinder and an open grate concave for threshing grain from the heads of crop material and for separating a substantial part of the grain from the crop material. The second stage for the separation of grain from the straw includes a raddle to convey the straw from the cylinder and a fanning mill to provide a stream of air through which the material passes at the end of the raddle. The third and final stage for separation of grain from the straw includes straw walkers which shake the straw received from the raddle to separate any remaining grain. All the grain removed from the straw during the three separate stages is conveyed to a shaker shoe where the grain is cleaned and collected and then conveyed to a grain tank.

Other objects and advantages of this invention will become apparent from the following description taken in connection with the accompanying drawings in which:

FIG. 2 is a diagrammatic cross-sectional elevation of a portion of the combine shown in FIG. 1; and FIG. 3 is a cross section of the line 3—3 in FIG. 2 of a portion of the machine.

Figure 1:
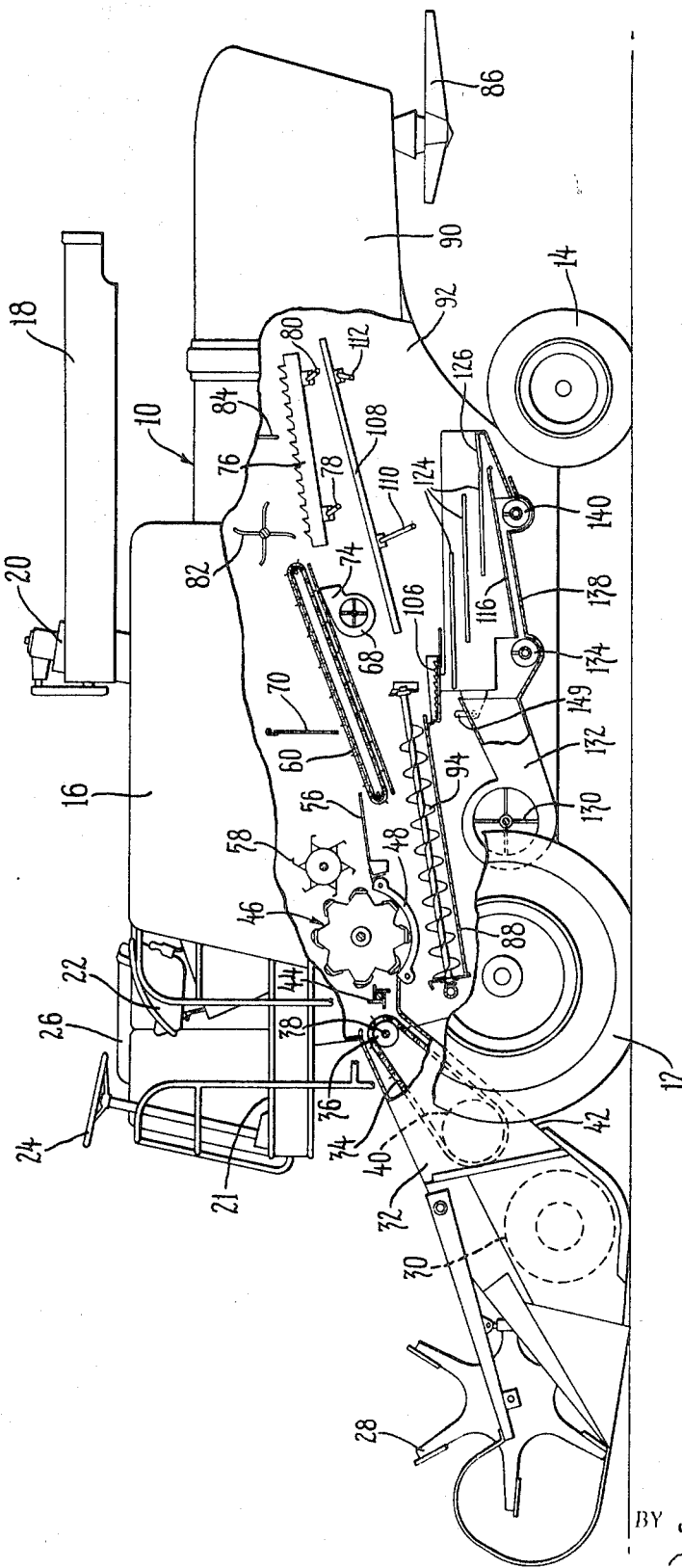
FIG. 1 is a diagrammatic elevational view of an agricultural combine with parts of the casing broken away illustrating the assembly.

There is shown in FIG. 1 a self-propelled grain combine for harvesting and threshing various grain crops which employs the improved separator of this invention. This combine includes a separator assembly 10 mounted on a frame supported by front drive wheels 12 and rear wheels 14 for steering. A grain tank 16 for temporary storage of grain is carried by the forward portion of the frame. A series of unloading augers for conveying grain from the grain tank 16 are supported by the grain tank. The upper grain tank unloading auger 18, which is shown in a transport position, may be pivoted 90° about its support, on the upper end of the vertical grain tank unloading auger 20, to extend in a direction perpendicular to the direction of movement of the machine for unloading the grain tank. An operator's platform 21 with a seat 22, a steering wheel 24, and a control console 26 is mounted on the forward portion of the separator assembly 10. An internal combustion engine (not shown) is carried on the machine to operate the grain harvesting and threshing mechanisms and to drive the drive wheels 12. A header assembly is mounted on the front of the separator assembly 10.

The header assembly has a knife (not shown) and a reel 28 for severing crop material from the ground. An auger 30 conveys the severed crop material toward the center of the machine and into the elevator 32 to the cylinder. A raddle 34 in the elevator 32 to the cylinder, which is driven by the sprockets 36 on the upper shaft 38 and is carried by a floating drum 40 at the lower end, conveys crop material under its lower run against the bottom 42 of the elevator from the auger to the beater 44 in front of the cylinder. The elevator 32 of the cylinder is pivotally mounted to the separator for pivotal movement about an axis through the upper shaft 38. The elevator is pivoted about its pivotal axis to adjust the height of the cutter bar relative to the ground.

The separator assembly 10 of this invention, as best shown in FIG. 2, has three separate stages for separating grain from the straw and a shaker shoe for separating chaff from the grain. The first stage for separating grain from the straw includes the cylinder 46 and the open grate concave 48. The cylinder has a cylinder shaft 50 which is rotatably supported, two or more drums 52 mounted on the shaft, and a plurality of rasp bars 54 extending the width of the separator assembly 10 mounted on the outer edges of the drums. An open grate concave 48 with an extension grate 56 attached to its rear end is located directly below the cylinder 46. Crop material from the elevator 32 to the cylinder passes under the beater 44 in front of the cylinder and between the cylinder 46 and the open grate concave 48 where the grain is removed from the heads. The removal of grain from the heads or threshing is controlled by adjusting the speed at which the cylinder 46 rotates and the space between the rasp bars 54 and the open grate concave 48. A beater 58 behind the cylinder is provided to prevent straw from going completely around the cylinder 46 and between the cylinder and the open grate concave 48 a second time. The beater 58 behind the cylinder also helps to convey the straw to the rear. Up to 90 percent of the grain which the cylinder 46 and the open grate concave 48 remove from the heads of the crop material and a considerable amount of chaff passes through the open grate concave 48 and the concave extension grate 56. The grain which remains mixed with the straw must be separated by either the second stage for separation or the third stage for separation.

The second stage for separation of grain from the straw consists of a raddle 60, a pan 62 mounted under the top run of the raddle, guides 64 supporting the lower run of raddle 60, tightener mechanisms 66 to adjust tension on the chains to compensate for wear, and a fanning mill 68 mounted under the raddle. The pan 62 includes a screen 63 in its midsection. The forward end of the raddle 60 is located under the rear end of a concave extension grate 56 so that all of the straw from the concave extension grate 56 is conveyed up and to the rear by the raddle 60. The raddle 60 conveys the straw and allows additional grain to separate from the straw. Some of the grain falls through the straw to the pan 62 under the upper run of the raddle 60 and through the screen 63. Additional grain is carried up the pan 62 to the rear end of the raddle 60. A flexible curtain deflector 70 is mounted above the raddle 60 on a shaft 72 to stop any grain which the cylinder 46 or the beater 58 behind the cylinder 46 might throw over the raddle 60. The fanning mill 68 below the raddle 60 has a nozzle 74 which directs air up and to the rear through the straw and grain leaving the rear end of the raddle 60. The relatively heavy kernels of grain fall down through the stream of air and onto a long grain pan 108 under the raddle 60 and the straw walkers 76. The straw, with the help of the beater 82, moves from the raddle 60 to the third and final stage for separation of grain from the straw.

The third and final stage for separation of grain from the straw consists of from three to six straw walkers 76 mounted on a pair of rotatable crankshafts 78 and 80, a beater 82 mounted above the front end of the straw walkers 76 and a flexible curtain 84, identical to the curtain 70 mounted above the raddle 60, mounted above the straw walkers 76 and to the rear of the beater 82. The beater 82 above the straw walkers 76 turns counterclockwise as seen in FIG. 2 to convey straw from the raddle 60 to the rear and down onto the straw walkers 76. The straw walkers 76 periodically toss the straw up while moving it to the rear to separate any remaining grain. The grain separated from the straw by the straw walkers 76 falls through holes in the top of the open bottom straw walkers 76. The straw is conveyed to the rear of the straw walkers 76 and falls through a hole in the bottom of the rear portion of the separator assembly 10. The straw spreader 86, as shown in FIG. 1, bats the straw from the straw walkers 76 to spread it on the ground behind the combine. Grain chaff, straw, dirt, and other foreign material separated from the straw by the open grate concave 48 and the concave extension grate 56 fall into a plurality of U-shaped troughs 88 shown in FIG. 3. The troughs extend below the concave from one side 90 of the separator assembly 10 to the other side 92. An auger 94 is supported in each U-shaped trough 88. The forward end of each auger 94 is supported by a bearing 96 in a plate 98 which extends across the front of the U-shaped troughs 88. The rear end of each auger 94 is supported by a bearing 100 attached to a support 102 connected to the sides 90 and 92 of the separator assembly 10 to the rear of the rear end of the U-shape troughs 88. The augers 94 are rotated by gears 104 and 105 so that they convey the grain and chaff which falls through the open grate concave 48 and the concave extension grate 56 to the rear and deposit it on the short main grain pan 106. The grain which falls through the screen 63 in the midsection of pan 62 falls onto the main grain pan 106.

A long grain pan 108, which extends from one side of the separator assembly 10 to the other, is under the entire straw walkers 76 and the rear portion of the raddle 60. The grain pan is mounted on a crankshaft 110 at the front and a crankshaft 112 at the rear. The crankshaft 112 at one end is driven so that the grain pan oscillates back and forth. A portion of the grain separated from the straw by the raddle 60 and all the grain separated from the straw by the straw walkers 76, falls to the long grain pan 108 which carries grain and chaff forward as a result of the oscillations. The grain and chaff fall from the forward portion of the long grain pan 108 onto the short main grain pan 106.

The main grain pan is mounted on the forward portion of the shaker shoe. The shaker shoe has a frame, which includes sidewalls 114, a forward bottom wall 116, and a rear bottom wall 118, supported inside the separator assembly 10. The shaker shoe is supported at the front by brackets 120 attached to an oscillating crankshaft 149 and at the rear by two pair of blocks 122 attached to the forward bottom wall 116 adjacent to each of the sidewalls 114 for back and forth oscillations on hangers 151. Three screens 124 are mounted between the sidewalls 114 of the shoe. An extension screen 126 is attached to the rear of the bottom screen 124 and to the rear portion 128 of the shaker shoe frame. A fanning mill, with a fan 130 in a fan housing 132, is located in front of the shaker shoe. A clean grain auger 134 in a trough 136 in the bottom 138 of the separator assembly 10 near the forward portion of the shaker shoe. A tailings auger 140 is in a trough 142 in the bottom 138 of the separator assembly 10 near the forward end of the rear bottom wall 118 of the shaker shoe. A rubber flap 144 is attached to the front wall of the main grain pan 106 to allow the grain pan to oscillate back and forth and to close the opening between the main grain pan and the bottom of the U-shaped troughs 88 under the concave 48. A grain pan extension grate 148 is attached to the rear of the main grain pan 106. The grain and chaff from the augers 94 under the concave and the long grain pan 108 fall on the main grain pan 106 which evenly distributes the grain and chaff across the forward portion of the top screen 124. Due to the fan 130 of the fanning mill forcing air up through the screens 124 and out the rear of the machine and the oscillations of the shaker shoe, the grain falls through the screens 124 and the chaff is blown out the rear of the machine. The clean grain which falls through the screens 124 falls directly into the clean grain auger 134 or is caught by the forward bottom wall 116 of the shaker shoe and carried forward to the clean grain auger 134. The clean grain auger 134 conveys the grain to an elevator (not shown) which elevates the grain to the grain tank 16.

Pieces of heads containing grain, which are too large to pass through the screens 124, pass through the extension screen 126 and are conveyed to the tailings auger 140 by the rear bottom wall 118 of the shaker shoe. The tailings auger 140 conveys the tailings to a return elevator (not shown) which elevates the material to be rethreshed.

In operation, the crop material which is severed from the ground by the header assembly is conveyed to the cylinder 46 by the elevator 32 to the cylinder and the beater 44 in front of the cylinder. The crop material is threshed by the rasp bars 54 and the open grate concave 48. Up to 90 percent of the grain and some of the chaff fall through the open grate concave 48 and the concave extension grate 56. The straw and some of the grain are conveyed from the cylinder to the raddle 60 with the help of the beater 58 behind the cylinder. While conveying the straw to the rear on the raddle 60, some of the remaining grain settles to the bottom where it is carried, on the pan 62 mounted under the upper run of the raddle 60, toward the rear. A portion of the grain falls through the screen 63 in the midsection of the pan 68. Additional grain separated by the raddle 60 falls from the rear of the raddle 60 through a stream of air from the nozzle 74 of the fanning mill 68 and is partially cleaned. The straw also passes through the stream of air and on to the straw walkers 76 with the help of the beater 82 above the forward end of the straw walkers 76. Any grain remaining mixed with the straw is separated, as the straw walkers 76 toss the straw up and to the rear, and passes through holes in each walker. The grain from the walkers 76 and the rear of raddle 60 falls to a long grain pan 108 which conveys it forward and deposits it on a short main grain pan 106 attached to the front of the shaker shoe. The grain and chaff, which falls through the open grate concave 48 and the concave extension grate 56, are conveyed to the rear by several augers 94 and deposited on the main grain pan 106. The main grain pan 106 conveys the grain and chaff to the shaker shoe where a stream of air from the fan 130 of the main fanning mill and the three screens 124 separate the grain from the chaff and dirt. Clean grain from the shaker shoe is conveyed to the grain tank 16. Partially threshed material from the shaker shoe is conveyed back to the cylinder 46 for rethreshing or to a separate rethreshing mechanism. The chaff and dirt mixed with the grain received by the main grain pan 106 are blown out the back of the machine.

We claim:

1. A crop threshing and separating assembly having three stages of grain separation including a first separation stage which includes a rotatable cylinder and an open grate concave acting in combination for threshing grain from the heads of crop material and for separating substantial part of the grain from the straw, a second separation stage including raddle means to convey the straw from the cylinder and concave, a third separation stage including means to periodically toss the straw up and to the rear to separate any remaining grain and to convey the straw from the machine, cleaning means for cleaning the grain separated from the straw, and means for collecting all the grain separated from the straw including conveyor means mounted under the concave and said raddle to receive the grain separated from the straw by at least the cylinder and concave and to convey the grain to said cleaning means.

2. The threshing and separating assembly of claim 1 wherein said second separation stage includes means to subject the straw to a stream of air.

3. The threshing and separating assembly of claims 1 or 2 wherein said first stage includes a concave extension grate on the rear end of the concave which allows additional grain to separate from the straw.

4. The threshing assembly of claim 2 wherein the means to subject the straw to a stream of air is a fanning mill mounted under the raddle means with a nozzle having an opening adjacent to the rear of said raddle means that directs a stream of air up and to the rear.

5. The threshing and separating assembly of claims 1 or 2 wherein said means for cleaning the separated grain includes a shaker shoe, with a plurality of screens, that shakes back and forth and a fanning mill which blows air up and to the rear through the screens.

6. The threshing and separating assembly of claim 1 wherein said means to periodically toss the straw up and to the rear includes straw walkers.

7. The threshing and separating assembly of claim 6 wherein said means for collecting the grain separated from the straw includes a grain pan mounted under straw walkers and the rear of said raddle means for receiving grain from said raddle means and said straw walkers and for conveying grain forward to the cleaning means, and conveyor means mounted under the open grate concave for conveying grain toward the rear to the cleaning means.

8. The crop harvesting and threshing machine of claims 1 or 2 wherein the means for collecting the grain separated from the straw in the first separation stage includes a plurality of augers under the open grate concave.

9. A crop threshing and separating assembly having three stages of grain separation including a first separation stage which includes a rotatable cylinder and an open grate concave and concave extension acting in combination for threshing grain from the heads of crop material and for separating a substantial part of the grain from the straw, a second separation stage including raddle means extending toward the rear of the separating assembly and up from a point adjacent to the rear portion of the concave extension to convey the straw from the cylinder, concave and concave extension and a nozzle to direct a stream of air up and to the rear through the straw leaving the rear of the raddle, a third separation stage including straw walkers for receiving straw from the raddle to periodically toss the straw up and to the rear to separate any remaining grain and to convey the straw from the machine, a shaker shoe with a plurality of screens that shake back and forth and a fan which blows air up and to the rear through the screens for cleaning the grain separated from the straw in the three separate stages for grain separation, conveyor means mounted under the concave and concave extension and the raddle to receive the grain separated from the straw by at least the cylinder, concave and concave extension and to convey the grain to the shaker shoe for cleaning, and conveyor means for collecting all the grain separated from the straw in at least the third separation stage to convey the grain to the shaker shoe for cleaning.